(12) United States Patent
Wang et al.

(10) Patent No.: US 8,783,570 B2
(45) Date of Patent: Jul. 22, 2014

(54) READER WITH OPTICAL CHARACTER RECOGNITION

(75) Inventors: Xiaomei Wang, Port Jefferson Station, NY (US); Christopher J. Fjellstad, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1310 days.

(21) Appl. No.: 11/842,369

(22) Filed: Aug. 21, 2007

(65) Prior Publication Data

US 2009/0050701 A1 Feb. 26, 2009

(51) Int. Cl.
*G06K 9/34* (2006.01)

(52) U.S. Cl.
USPC ........... 235/454; 235/487; 235/494; 382/176; 382/177; 382/182; 382/209; 382/224

(58) Field of Classification Search
CPC . G06K 9/00; G06K 9/00442; G06K 9/00456; G06K 9/00463; G06K 9/00469; G06K 9/00483
USPC .......... 235/439, 454, 462.01, 462.41, 472.01; 382/176
See application file for complete search history.

(56) References Cited

U.S. PATENT DOCUMENTS

| | | | | |
|---|---|---|---|---|
| 5,574,802 A | * | 11/1996 | Ozaki | 382/176 |
| 5,706,364 A | * | 1/1998 | Kopec et al. | 382/159 |
| 5,796,088 A | * | 8/1998 | Wall | 235/472.01 |
| 6,053,413 A | * | 4/2000 | Swift et al. | 235/472.01 |
| 6,671,417 B1 | * | 12/2003 | Koshinaka | 382/254 |
| 6,687,404 B1 | * | 2/2004 | Hull et al. | 382/226 |
| 6,744,938 B1 | * | 6/2004 | Rantze et al. | 382/312 |
| 2002/0191847 A1 | * | 12/2002 | Newman et al. | 382/176 |
| 2003/0128875 A1 | * | 7/2003 | Pilu et al. | 382/177 |
| 2004/0084535 A1 | | 5/2004 | Kubota | |
| 2005/0164541 A1 | * | 7/2005 | Joy et al. | 439/352 |
| 2005/0289182 A1 | * | 12/2005 | Pandian et al. | 707/104.1 |
| 2006/0026078 A1 | * | 2/2006 | King et al. | 705/26 |
| 2006/0208083 A1 | * | 9/2006 | Kotlarsky et al. | 235/462.01 |
| 2006/0262910 A1 | | 11/2006 | Molnar et al. | |

FOREIGN PATENT DOCUMENTS

| | | |
|---|---|---|
| EP | 1418531 A2 | 5/2001 |
| WO | 2006124473 A2 | 11/2006 |

OTHER PUBLICATIONS

International Preliminary Report on Patentability and the Written Opinion of the International Searching Authority for International Application No. PCT/US2008/073553 dated Feb. 24, 2010.
"How to Use Regular Expression in Microsoft Visual Basic 6.0," accessed at http://supportmicrosoft.com/kb/818802; Nov. 26, 2007.
Good, A. N., "How to use regular expressions in PHP," accessed at http://www.ibm.com/developerworks/edu/os-dw-os-phpexpr-i. html, Jan. 10, 2006.
International Search Report for International Application No. PCT/US2008/073553 mailed on Nov. 27, 2008.

* cited by examiner

*Primary Examiner* — Christopher Stanford
(74) *Attorney, Agent, or Firm* — Nong-Qiang Fan

(57) ABSTRACT

An imaging-based bar code reader that includes an imaging and decoding system. Focusing optics and a sensor array define a field of view. A data processor has a memory for storing a pattern definition of previously imaged OCR characters and comparing a format of said previously stored characters to a present image to determine a character content of the present image.

19 Claims, 3 Drawing Sheets

READER WITH OPTICAL CHARACTER RECOGNITION

FIELD OF THE INVENTION

The present invention relates to an imaging-based bar code reader and, more particularly, to a bar code reader that facilitates capturing images.

BACKGROUND OF THE INVENTION

Various electro-optical systems have been developed for reading optical indicia, such as bar codes. A bar code is a coded pattern of graphical indicia comprised of a series of bars and spaces having differing light reflecting characteristics. The pattern of the bars and spaces encode information. In certain bar codes, there is a single row of bars and spaces, typically of varying widths. Such bar codes are referred to as one dimensional (1D) bar codes. Other bar codes include multiple rows of bars and spaces, each row typically having the same width. Such bar codes are referred to as two dimensional (2D) bar codes.

Imaging systems include charge coupled device (CCD) arrays, complementary metal oxide semiconductor (CMOS) arrays, or other imaging pixel arrays having a plurality of photosensitive elements or pixels. An illumination system comprising light emitting diodes (LEDs) or other light source directs illumination toward a target object, e.g., a target bar code. Light reflected from the target bar code is focused through a lens of the imaging system onto the pixel array. Thus, an image of a field of view of the focusing lens is focused on the pixel array. Periodically, the pixels of the array are sequentially read out generating an analog signal representative of a captured image frame. The analog signal is amplified by a gain factor and the amplified analog signal is digitized by an analog-to-digital converter. Decoding circuitry of the imaging system processes the digitized signals and decodes the imaged bar code.

Efficient decoding of text has been more difficult than decoding of bar code symbols. Unlike flatbed scanners, which usually have perfect focus, perfect illumination, hand held bar code scanners are prone to blurry images, distortion, uneven illumination etc. at least compared to the images from a stationary flatbed scanner. Current existing methods of formatting text involves either scanning a representing barcode for each character, or providing a regular expression of the format of the characters to be read by the bar code reader. The first method is error prone and the second requires a well trained user to provide an appropriate regular expression as a template.

OCR A, OCR B and MICR are standardized, monospaced fonts designed for "Optical Character Recognition" on electronic devices. OCR A was developed to meet the standards set by the American National Standards Institute in 1966 for the processing of documents by banks, credit card companies and similar businesses. This font was intended to be "read" by scanning devices, and not necessarily by humans.

OCR B was designed in 1968 to meet the standards of the European Computer Manufacturer's Association. It was intended for use on products that were to be scanned by electronic devices as well as read by humans. OCR B was made a world standard in 1973, and is more legible to human eyes than most other OCR fonts.

MICR is a character recognition technology adopted mainly by the banking industry to facilitate the processing of cheques. The major MICR fonts used around the world are E-13B and CMC-7. Almost all US and UK cheques now include MICR characters at the bottom of the paper in the E-13B font. Some countries, including France, use the CMC-7 font developed by Bull. Other fonts have been developed and are known in the optical character recognition art.

SUMMARY OF THE INVENTION

An imaging-based bar code reader that includes an imaging and decoding system. The system automates the generation of a pattern of the format of an optical character recognition string whose content is unknown and is to be read by the hand held scanner. One advantage to such a system is to decrease errors and to promote efficiency. An exemplary method does not require user training and is quite user friendly during operation.

The exemplary system automates the generation of a pattern of the format to be read by scanning one or more test or template samples of the same format that will be encountered in reading unknown strings. The template is easy to read so that once the string is decoded, the format of the decoded data is recorded in the memory of the system to allow strings of the same format to be correctly read.

These and other objects, advantages, and features of the exemplary embodiment of the invention are described in detail in conjunction with the accompanying drawings.

DETAILED DESCRIPTION

Figure 3:
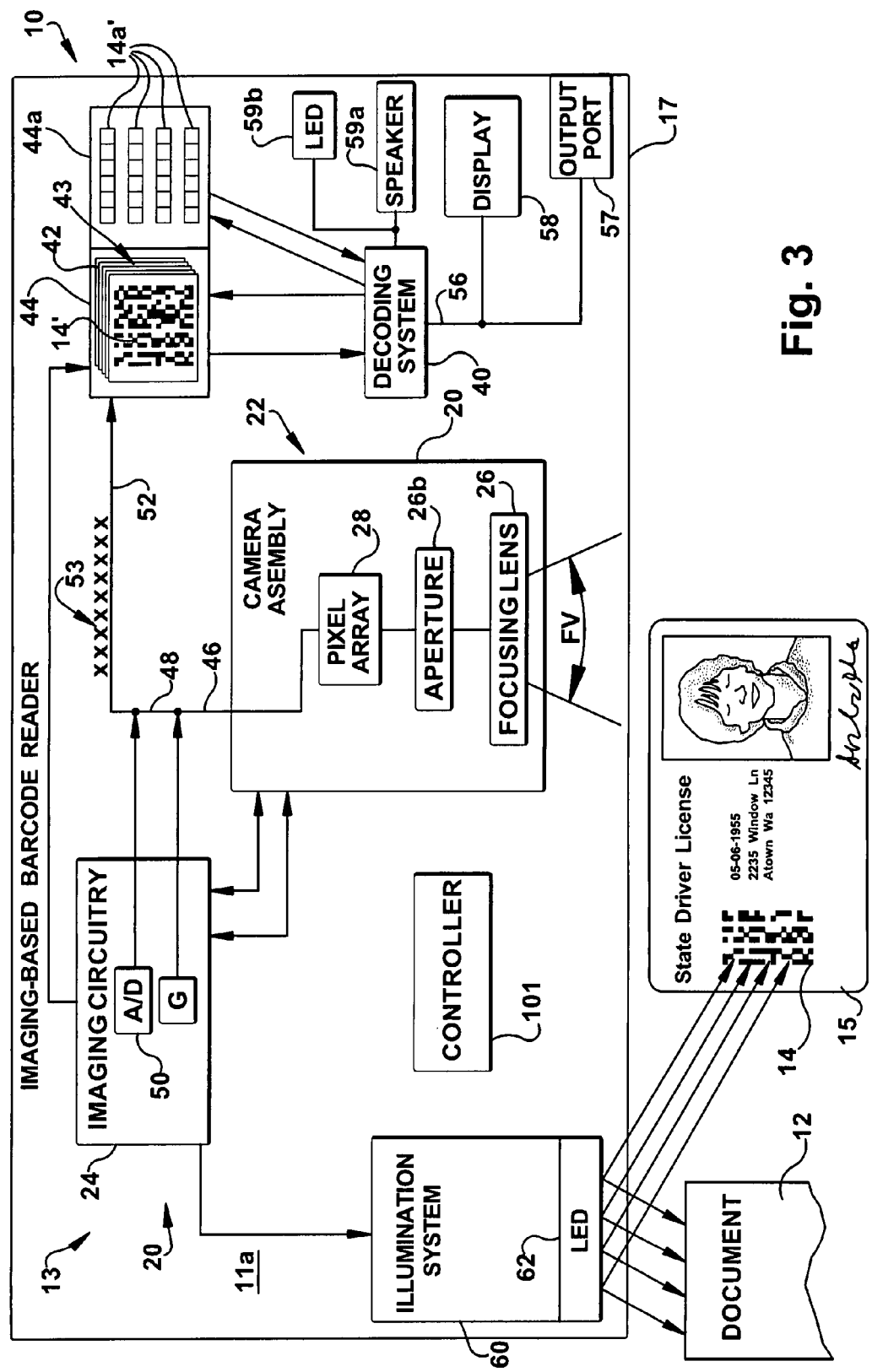
FIG. 3 is a block circuit diagram of the imaging-based bar code reader of FIG. 1.

An imaging-based scanner that is capable of reading bar codes is shown schematically at 10 in the Figures. The scanner 10 is capable of imaging and decoding bar codes, such as a 2D bar code shown at 14 in FIG. 3. Additionally, the reader 10 is also capable of capturing images such as an image or a document 12 in FIG. 3 that contains signatures, graphics or the like. The bar code reader 10 includes a housing 11 supporting an imaging system 20 and a decoding system 40 (FIG. 3). The housing 11 supports a transparent window 17 through which reflected illumination from the target bar code 14 is received by the imaging system 20.

When enabled, the imaging system 20 captures an image frame 42 of a field of view FV of the imaging system. If imaging a target bar code 14, the imaging process captures an image 14' of the target bar code. The decoding system 40 analyzes a captured image frame 42 and attempts to decode decodable portions of the imaged bar code 14'. The decoded portions 14a' of the imaged bar code 14' are stored in a buffer memory 44a. Alternately, a series of image frames 43 are captured and using a sequence stitching method. A decoded portion 14a' is stored in the buffer memory 44a and the decoding system 40 attempts to combine or stitch the decoded portions 14a' stored in buffer memory to achieve a full decode of the target bar code 14.

The imaging system 20 includes an imaging camera 22 (FIG. 2) and associated imaging circuitry 24. The imaging camera 22 includes a housing supporting focusing optics including a focusing lens 26 and a 2D photosensor or pixel array 28. The imaging camera 22 is enabled during an imaging session to capture a sequence of images of the field of view FV of the focusing lens 26.

Figure 1:
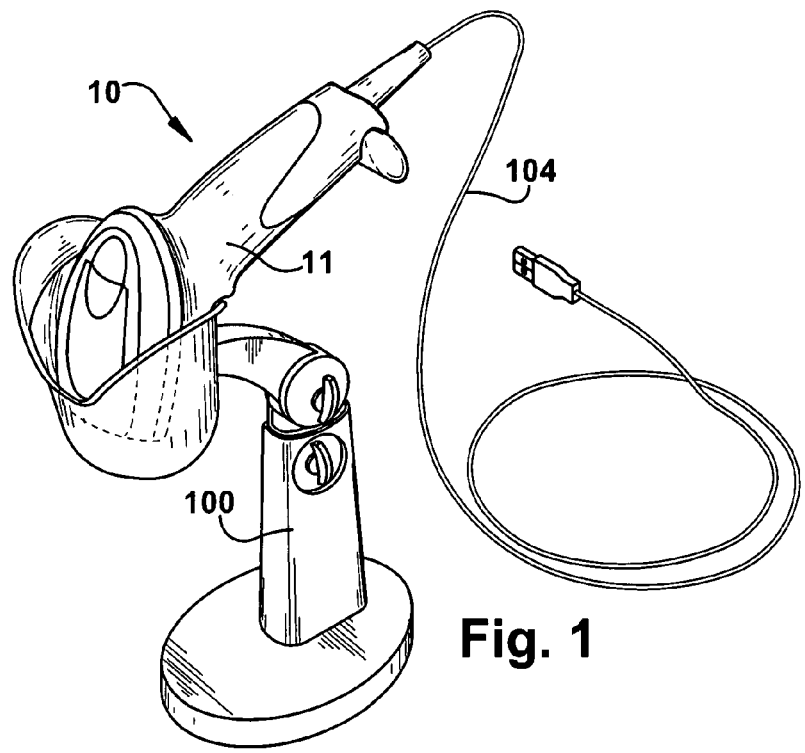
FIG. 1 is a perspective view of a bar code scanner supported on a stationary stand.

In one mode of operation, the bar code reader 10 is a hands-free reader including a generally upright housing 11 having a flat base portion that can be placed on a counter or tabletop. The scanner 10 of FIG. 1 is supported by a support stand 100. When so mounted, the exposure operation mode of the camera can be altered as described more completely below to enhance the image quality of the resulting image produced by the scanner 10.

Figure 2:
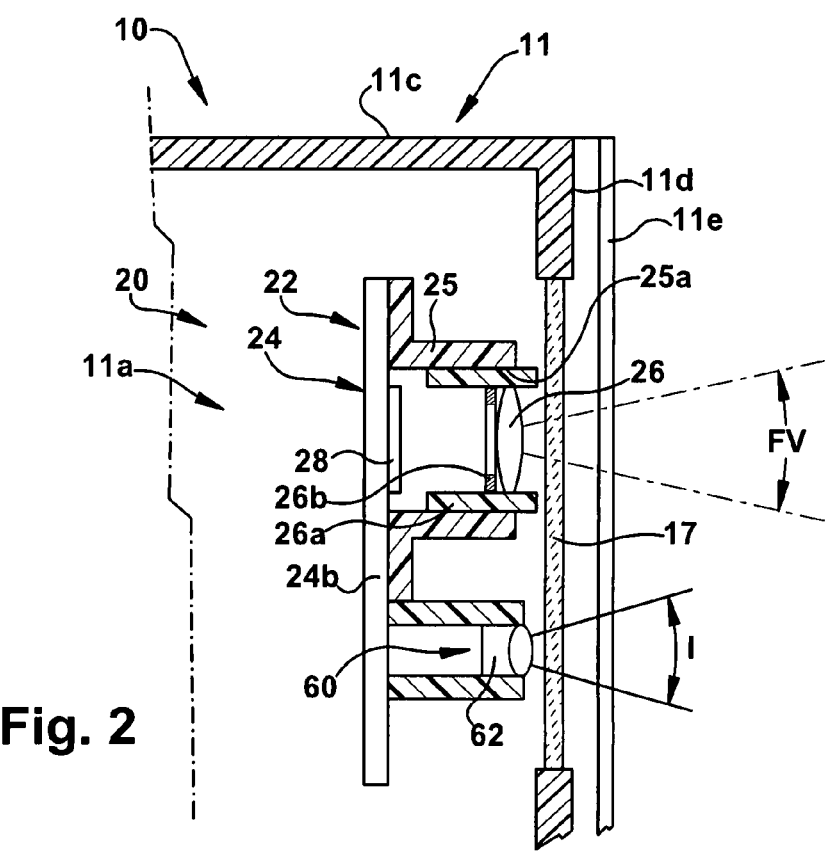
FIG. 2 is a schematic sectional view of a portion of the imaging-based bar code reader showing the scanner head.

As is best seen in FIG. 2, the housing 11 defines the interior area 11a. Disposed within the interior area 11a circuitry 13 including the imaging and decoding systems 20, 40 and an illumination assembly 60 which, when enabled, directs illumination through the transparent window 17 and onto a target. The bar code reader circuitry 13 is electrically coupled to a power supply 16, which may be in the form of an on-board battery or a connected off-board power supply. If powered by an on-board battery, the reader 10 may be a stand-alone, portable unit. If powered by an off-board power supply, the reader 10 may have some or all of the reader's functionality provided by a connected host device.

Circuitry associated with the imaging and decoding systems 20, 40, including the imaging circuitry 24, may be embodied in hardware, software, electrical circuitry or any combination thereof and may be disposed within, partially within, or external to the camera assembly housing 25. In the illustrated embodiment, the functions of the reader are controlled and co-ordinated by a microprocessor controller 101. The controller 101 also manages outputs from the decoding system 40 such as an output 56 to a display 58 and communications output port 57 and visual and audible signals from an LED 59b and speaker 59a. The imaging camera housing 25 is supported with an upper or scanning head portion 11c of the housing and receives reflected illumination from the target bar code 14 through the transparent window 17 supported by the scanning head 11c. The focusing lens 26 is supported by a lens holder 26a. The camera housing 25 defines a front opening 25a that supports and seals against the lens holder 26a so that the only illumination incident upon the sensor array 28 is illumination passing through the focusing lens 26.

Depending on the specifics of the camera assembly 22, the lens holder 26a may slide in and out within the camera housing front opening 25a to allow dual focusing under the control of the imaging circuitry 24 or the lens holder 26a may be fixed with respect to the camera housing 25 in a fixed focus camera assembly. The lens holder 26a is typically made of metal. A back end of the housing 25 may be comprised of a printed circuit board 24b, which forms part of the imaging circuitry 24 and may extend beyond the housing 25 to support the illumination system 60.

The imaging system 20 includes the sensor array 28 which may comprise a charged coupled device (CCD), a complementary metal oxide semiconductor (CMOS), or other imaging pixel array, operating under the control of the imaging circuitry 24. In one exemplary embodiment, the pixel array 28 comprises a two dimensional (2D) mega pixel array with a typical size of the pixel array being on the order of 1280×1024 pixels. The pixel array 28 is secured to the printed circuit board 24b, in parallel direction for stability.

As is best seen in FIG. 2, the focusing lens 26 focuses light reflected from the target bar code 14 through an aperture 26b onto the pixel/photosensor array 28. Thus, the focusing lens 26 focuses an image of the target bar code 14 (assuming it is within the field of view FV) onto the array of pixels comprising the pixel array 28. The focusing lens 26 field of view FV includes both a horizontal and a vertical field of view, the vertical field of view being shown schematically as FV in FIG. 1.

During an imaging session, one or more images in the field of view FV of the reader 10 may be obtained by the imaging system 20. An imaging session may be instituted by an operator, for example, pressing a trigger to institute an imaging session. Alternately, the imaging system 20 may institute an imaging session when a lower or bottom edge of the item 15 moves through an upper portion of the field of view FV. Yet another alternative is to have the imaging system 30 always operational such that image after image is captured and analyzed for the presence of data within an imaged target. In any event, the process of capturing an image 42 of the field of view FV during an imaging session is known in the scanner art. Electrical signals are generated by reading out of some or all of the pixels of the pixel array 28 after an exposure period. After the exposure time has elapsed, some or all of the pixels of pixel array 28 are successively read out, thereby generating an analog signal 46. In some sensors, particularly CMOS sensors, all pixels of the pixel array 28 are not exposed at the same time, thus, reading out of some pixels may coincide in time with an exposure period for some other pixels.

The analog image signal 46 from the pixel array represents a sequence of photosensor voltage values, the magnitude of each value representing an intensity of the reflected light received by a photosensor/pixel during an exposure period. The analog signal 46 is amplified by a gain factor, generating an amplified analog signal 48. The imaging circuitry 24 further includes an analog-to-digital (A/D) converter 50. The amplified analog signal 48 is digitized by the A/D converter 50 generating a digitized signal 52. The digitized signal 52 comprises a sequence of digital gray scale values 53 typically ranging from 0-255 (for an eight bit processor, i.e., $2^8$=256), where a 0 gray scale value would represent an absence of any reflected light received by a pixel (characterized as low pixel brightness) and a 255 gray scale value would represent a very intense level of reflected light received by a pixel during an integration period (characterized as high pixel brightness).

Imaging and Decoding Process

The exemplary image based scanner 10 has a character recognition capability. If, as depicted in FIG. 3 the image captured by the scanner includes characters, the scanner has the ability to interpret, store and transmit the data embodied by those characters using the exemplary process.

In order to more effectively capture character data, the exemplary system reads the data from easy to read sample or template targets and generates a format for the easy to read data so that unknown data can then be accurately read without resort to user input.

Consider the drivers license identified with reference character 15 in FIG. 3. The imaging system 10 captures an image of the entire front or face of the license. In set up mode, easy to read character data such as the city, state and zip data is gathered by reading out the pixel array 28 after an exposure time to generate the analog signal 46 and the analog signal is digitized and digital gray scale values 53 are generated and stored in memory 44. This process may be repeated multiple times during a setup up imaging session by storing a sequence of captured images in the memory 44. Easily recognized characters may be obtained in a reliable non error prone manner. This may be due to use of a particular font (OCR A or OCR B) on this data, or it may be due to a reliable image capture process such as assuring that the reader is mounted to its stand 100. An additional safeguard for reliability can be use of only easy to recognize characters within a character set. O's can be confused with zeros and Z's can be confused with the letter two, but the letters C, P, E, etc. are fairly unique and are not likely to be misinterpreted by the decoding circuity. Stated another way, only characters that are known in advance and that are not easily confused with other characters within a character set are used for setting up the character format.

The decoding system 40 then interprets the data to simplify or automate the generation of the pattern of the format of an OCR string to be read. To accomplish this task, scan several OCR strings that are printed very well and can be read easily. These OCR strings should be able to represent a string/strings to be read. Once these several strings are decoded correctly, the system will analyze the common attributes of their format to generate and store the format for reading other new strings with the same format.

For example, the format of a city address could have different length for city names, 2 alphabetic characters for state abbreviation, 5 digits or 9 digits for zip code. After scanning several representatives and interpreting from the system, a format for a regular expression (FIG. 4) could be generated as the format of OCR strings that are going to be read. Certain targets can have multiple strings per target and for those known targets multiple regular expressions are created so that in matching an unknown string the controller would try to match the regular expressions and if a match is found the string is saved. If no match is found, then the controller will reject the string and issue an audible or visible warning from the speaker or Led output.

Figure 4:
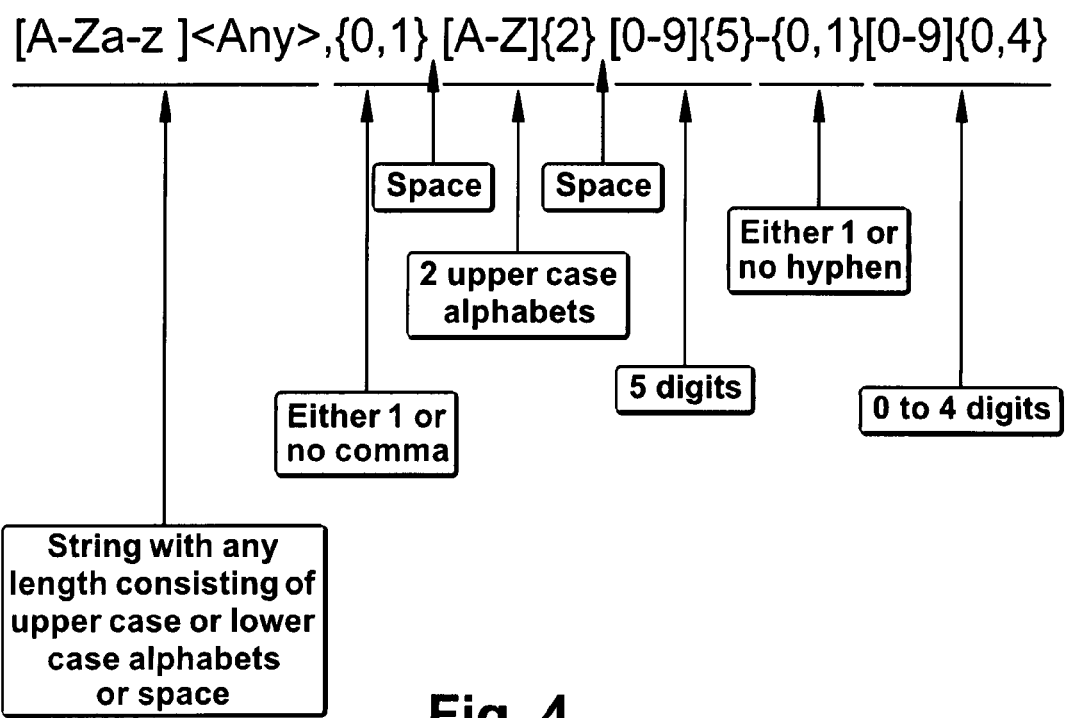
FIG. 4 is an illustration of a format for characterizing a character string of a target input.

This is illustrated by FIG. 4. In that figure, the symbology designates what is acceptable for certain locations within a character string. Beginning at the head or beginning of the string the first symbol is identified as the designator[A-Za-z ]<Any>. This indicates that the first part of the string can be any number of characters, both upper or lower case that can be separated by any number of spaces. One appropriate character string would be 'Atown'. This string has one capital letter followed by four lower case letters and no spaces. A similar acceptable string would be 'New York' which has two upper case letters with six lower case letters and one space. Note, appropriate symbology is available for alphanumerics, that is numbers or letters as well as specific symbols such as hyphens, commas etc.

For the decoding circuitry to recognize this example, more than one example would be used in the setup process since the use of spaces might not occur in a single example and accordingly would not be taken into account in the shorthand notation for the possible matching string.

Use of regular expressions is well documented in the literature as is filtering of string inputs to derive a regular expression that describes all examples in the input test string are known in the art. Examples of treatment of character strings and generation of regular expressions representing those strings are found in an article entitled "How to Use Regular Expression in Microsoft Visual Basic 6.0)" (http://support.microsoft.com/kb/818802) and "How to use regular expression in PHPH" (http://www.ibm.com/developerworks/edu/os-dw-os-phpexpr-i.html). These articles are incorporated herein by reference.

While the present invention has been described with a degree of particularity, it is the intent that the invention includes all modifications and alterations from the disclosed design falling within the spirit or scope of the appended claims.

We claim:

1. An imaging-based reader for reading a target comprising:
   a) an imaging and decoding system for imaging one or more standard targets having thereon OCR characters, the imaging and decoding system including focusing optics and a sensor array, the focusing optics defining a field of view for focusing reflected illumination from an image onto the sensor array; and
   b) a processor including a memory for storing a pattern definition determined from the previously imaged OCR characters and comparing the pattern definition determined from the previously imaged OCR characters to characters in a present image to determine a character content of the present image, wherein the pattern definition defines a string format that summarizes common attributes of a group of strings each describable with said string format, wherein said common attributes includes character type at one or more locations in any string belonging to said group of strings, and wherein the character type includes at least one of an alphabet, a numerical symbol, and a special character.

2. The imaging-based reader of claim 1 wherein the pattern definition includes spacing of characters with respect to each other within multiple target images taken at different times.

3. The imaging based reader of claim 2 wherein at least some of the characters are grouped together to form a string.

4. The imaging based reader of claim 3 wherein characters are grouped together into multiple strings that are categorized by multiple pattern definitions.

5. The imaging based reader of claim 4 wherein the pattern definitions are regular expressions.

6. The imaging based reader of claim 1 wherein the processor issues an audible or visual warning if the characters in the present image do not conform to the pattern definition from previously imaged OCR characters.

7. The imaging-based reader of claim 1 wherein the OCR characters are in an OCR font that includes at least one of the "OCR A" font and the "OCR B" font.

8. An imaging-based reader for reading a target comprising:
   a) an imaging and decoding system for imaging one or more standard targets having thereon OCR characters, the imaging and decoding system including focusing optics and a sensor array, the focusing optics defining a field of view for focusing reflected illumination from an image onto the sensor array;
   b) a processor including a memory for storing a pattern definition determined from the previously imaged OCR characters and comparing the pattern definition determined from the previously imaged OCR characters to characters in a present image to determine a character content of the present image;
   wherein the pattern definition of characters defines a string of characters; and
   wherein the pattern definition is a regular expression that is a set of characters specifying a make up of the string to enable the processor to readily determine an input string in a target image, regular expression is a set of characters that specify a pattern.

9. A method of reading a target comprising:
   a) providing an imaging and decoding system for imaging a target image, the imaging and decoding system including focusing optics and a sensor array, the focusing optics defining a field of view for focusing reflected illumination from the target image onto the sensor array;
   b) imaging one or more standard targets having easily recognized characters to determine a character format that includes a definition for defining the format of a string of characters that summarizes common attributes of a group of strings each describable with said format, wherein said common attributes includes character type at one or more locations in any string belonging to said group of strings and wherein the character type includes at least one of an alphabet, a numerical symbol, and a special character;

c) imaging a target having characters to be decoded; and d) using the character format to decode characters by fitting the characters to be decoded into the character format previously determined from the one or more standard targets prior to imaging of the target document.

10. The method of claim 9 wherein the character format is a regular expression.

11. The method of claim 9 wherein the character format includes spacing of characters with respect to each other within the standard targets.

12. The method of claim 9 additionally comprising emitting a warning indicator if the characters of the target do not fit the character format.

13. The method of claim 9 wherein during the imaging of standard targets, the imaging and decoding system is maintained in a fixed relation to the standard targets.

14. The method of claim 13 wherein the imaging and decoding system is a hand held bar code reader and wherein the reader is mounted in a stand as the standard targets are imaged for decoding.

15. Apparatus for reading a target comprising:

a) imaging means for imaging a target and possibly decoding a target bar code, said imaging means including focusing optics and a sensor array and processing electronics for processing signals from the sensor array, the focusing optics defining a field of view and focusing reflected illumination from the target bar code onto the sensor array;

b) decoding means for decoding easily recognized characters from one or more standard targets;

c) pattern generation means for generating format information from the decoded characters of the one or more standard targets, wherein the format information includes a definition for defining the format of a string of characters that summarizes common attributes of a group of strings each describable with said format, wherein said common attributes includes character type at one or more locations in any string belonging to said group of strings, and wherein the character type includes at least one of an alphabet, a numerical symbol, and a special character; and d) interpreting means for using the format information previously generated from the decoded characters of the standard targets to interpret a target having characters.

16. The apparatus of claim 15 wherein the pattern generation means comprises means for interpreting closely spaced characters as a string.

17. The apparatus of claim 16 wherein the pattern generation means comprises means for creating a regular expression.

18. The apparatus of claim 15 additionally comprising means for issuing a warning in the event the interpreting means cannot make the pattern of characters match the information stored from one or more standard targets.

19. The apparatus of claim 15 wherein the imaging means comprises a hand held bar code reader and additionally comprising a stand to support the hand held bar code reader as the standard targets are imaged.

* * * * *